United States Patent [19]

King

[11] 4,428,025

[45] Jan. 24, 1984

[54] COOLING ARRANGEMENTS

[75] Inventor: David R. King, Chelmsford, England

[73] Assignee: English Electric Valve Company Limited, Chelmsford, England

[21] Appl. No.: 264,422

[22] Filed: May 18, 1981

[30] Foreign Application Priority Data

May 19, 1980 [GB] United Kingdom ............... 8016435

[51] Int. Cl.³ ........................ H01G 1/08; F28F 1/40
[52] U.S. Cl. .................................... 361/274; 138/38
[58] Field of Search ................ 361/274, 279; 138/38

[56] References Cited

U.S. PATENT DOCUMENTS

| 2,115,769 | 5/1938 | Harris | 138/38 X |
| 2,819,731 | 1/1958 | Louthan | 138/38 |
| 3,571,677 | 3/1971 | Oeschger | 361/274 X |
| 4,315,299 | 2/1982 | Marcoux | 361/274 |

FOREIGN PATENT DOCUMENTS

| 2420002 | 11/1975 | Fed. Rep. of Germany | 138/38 |
| 689998 | 4/1953 | United Kingdom . |
| 746171 | 3/1956 | United Kingdom . |
| 1306224 | 2/1973 | United Kingdom . |
| 1355930 | 6/1974 | United Kingdom . |

OTHER PUBLICATIONS

Index to U.S. Patent Classification 12/80, p. 18.

Primary Examiner—Donald A. Griffin
Attorney, Agent, or Firm—Spencer & Frank

[57] ABSTRACT

A cooling arrangement which is primarily intended for incorporation in a high power variable capacitor consists of an elongate deflector mounted within an expandable tubular bellows. The movable end of the bellows carries one of two sets of capacitor vanes, and a fluid coolant is introduced into the other end of the bellows. The fluid is deflected by the deflector into the convolutions of the bellows wall to purge them of air which might otherwise be trapped. In this way the generation of localized hot spots is avoided.

13 Claims, 2 Drawing Figures

COOLING ARRANGEMENTS

BACKGROUND OF THE INVENTION

This invention relates to cooling arrangements in which an expandable bellows is to be prevented from overheating and to certain devices which incorporate cooling arrangements. The need arises to incorporate bellows into high power electronic components, which operate at power levels which can cause a great deal of energy to be dissipated within the bellows itself. A bellows is often incorporated into a high power variable capacitor to enable the vanes of the capacitor to be mounted within an evacuated enclosure, whilst permitting them to be moved as necessary to effect variation of the capacitance. It is possible to pass a fluid coolant over the surface of the bellows to prevent the temperature rising excessively, but it has proved extremely difficult to prevent the occurrence of localised hot spots at which serious overheating of the bellows can occur. It is believed that these difficulties stem from the convoluted configuration of a bellows surface and the present invention seeks to provide an improved cooling arrangement and a variable capacitor incorporating such an arrangement.

SUMMARY OF THE INVENTION

According to a first aspect of this invention, a cooling arrangement includes an expandable tubular bellows having a convoluted wall, an elongate deflector mounted within the bellows, means for admitting a fluid coolant flow into the region between the inner surface of the wall of the bellows and the deflector, the deflector being arranged to deflect the fluid coolant flow into the convolutions of the convoluted wall.

The bellows expands and contracts by a concertina action as the two ends of the bellows are pulled apart or pushed together respectively. The bellows has a cross-section area which increases to maxima values and decreases to minima values cyclically along its length, and the region of a bellows lying between two positions at which the area is a minima is herein termed a convolution.

Preferably the elongate deflector is in the form of a helical spiral, the spirally shaped surface of which deflects the fluid coolant flow. Preferably again the fluid is introduced at one end of the bellows.

Preferably again, the axis of the elongate deflector is substantially aligned with that of the tubular bellows. It is preferred that the bellows is of a cylindrical form, i.e. its cross-section is circular and that its diameter at a minima position is only slightly greater than the outer diameter of the helical spiral surface of the deflector.

The action of the fluid coolant flowing around the helical spiral is to fling the coolant outwardly into the convolutions of the convoluted wall with a swirling motion, and good results can be obtained if the deflector is made in the form of a multi-start helical spiral which therefore has a plurality of separate spirals.

Preferably the axial length of the elongate deflector corresponds at least approximately to the minimum length of the bellows when contracted, and preferably again the deflector is arranged so that when the bellows is expanded the deflector is positioned towards that end of the bellows at which the fluid coolant is admitted.

In this case, preferably the fluid coolant is admitted and removed at the same end of the bellows, with the fluid being caused to flow over the outer surface of the deflector when it is admitted and being returned along a channel formed within the body of the deflector.

The expandable bellows typically forms part of the construction of a high power variable capacitor and according to a second aspect of this invention a variable capacitor includes two sets of vanes, one set of which is carried by the movable end of an expandable tubular bellows which forms part of a cooling arrangement in accordance with the first aspect of this invention.

The heating of the bellows stems from the large radio frequency currents which flow in the convoluted wall surface of the bellows. The energy dissipated within the bellows can be reduced by minimising the electrical resistance of the walls of the bellows, but the material selected must be resiliently deformable, since its prime requirement is that it is suitable for use in a bellows.

Preferably the material is phosphor bronze.

BRIEF DESCRIPTION OF THE DRAWINGS

The invention is further described by way of example with reference to the accompanying drawings in which.

DESCRIPTION OF THE PREFERRED EMBODIMENT

Figure 1:
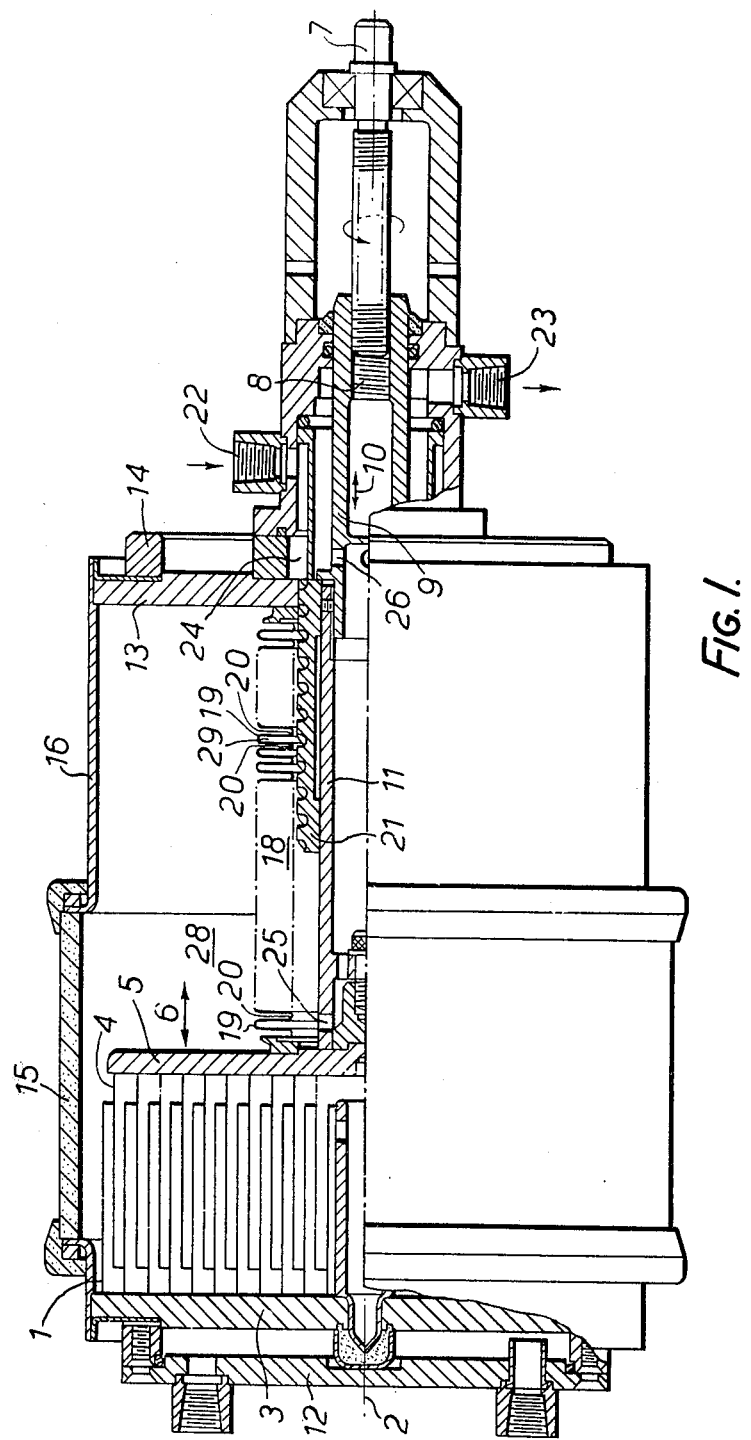
FIG. 1 shows a variable capacitor incorporating a cooling arrangement in accordance with the present invention and FIG. 2 shows the deflector in greater detail.

Referring to FIG. 1, the variable capacitor consists of a set of fixed cylindrical vanes 1, which are arranged concentrically about an axis 2 of symmetry and are firmly attached to a thick copper base plate 3. A second set of cylindrical vanes 4 are also mounted concentrically about the axis 2 and these vanes are firmly attached to a second copper plate 5. The vanes 4 are movable backwards and forwards in the direction of the double headed arrow 6 under the control of a rotatable shaft 7.

The shaft 7 is coupled by means of a screw thread 8 to a slider 9, which moves in the direction of the double headed arrow 10 in dependence of the direction of rotation of the shaft 7. The slider 9 is rigidly attached to one end of a hollow tube 11, the other end of which is connected to the plate 5. Thus, the extent to which the vanes 4 overlap or penetrate the vane 1 can be varied by rotation of the shaft 7, and it is the degree of overlap which determines the effective capacitance of the variable capacitor.

The variable capacitor is intended to operate at very high power levels with one electrical connection being made to the copper plate 3 via an outer copper disc 12, and another electrical connection being made to another copper plate 13 via a copper ring 14. In operation, a very high voltage, typically of the order of 30 kV is present between the two electrical terminals and in order to provide the necessary electrical insulation a ceramic sleeve 15 is located as shown. This sleeve 15, together with a co-operating copper sleeve 16, define an evacuated enclosure 28 within which the vanes 1 and 4 are situated.

The electrical radio frequency current flows from the ring 14 along the outer surface of the copper sleeve 16, back down the inner surface of this sleeve, radially across the inner surface of the copper plate 13 and along the outer surface of the wall of a bellows 18. The current flows along an outer wall of each conductor in view of its very high frequency.

The bellows 18 is provided so as to prevent air entering the evacuated enclosure 28 via the drive mechanism coupled to shaft 7 which is used to move the vanes 4. One end of the bellows 18 is attached in a gas tight manner to the plate 13, and the other end is attached to a similar gas tight manner to the plate 5. In FIG. 1, the bellows 18 is shown in its fully extended position.

The bellows 18 is of generally cylindrical form, that is to say it has a circular cross-section, and its maximum diameter is determined by the outer edges of the convolutions 19, whereas its minimum diameter is determined by the inner edges 20 of the convolutions. The region lying between two positions 20, and encompassing the position 19 is termed a convolution-one such convolution is indicated by the reference 29. A deflector 21 is mounted within the bellows 18 and is rigidly connected to the copper plate 13. The deflector 21 has an outer surface which is provided with a multi-start helical spiral, which is in essence similar to the profile of a screw thread, but the helical recesses are very much deeper.

Figure 2:
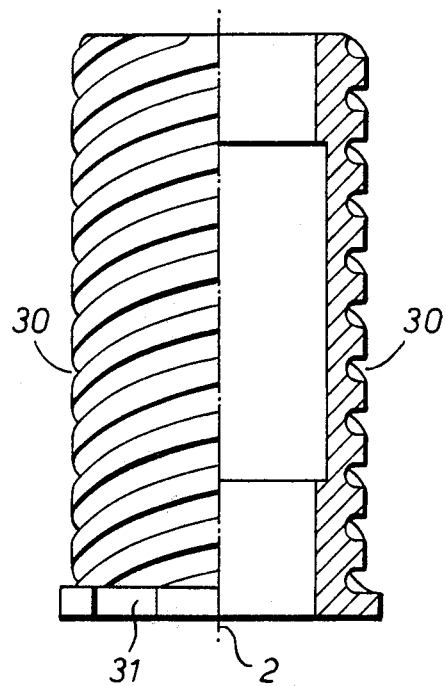

The nature of the deflector 21 can be seen in greater detail in FIG. 2. It is in the form of a hollow cylinder and the tube 11 is arranged to slide within it and be supported by it.

Whereas the current is arranged to flow wherever possible through copper conductors so as to minimise resistive losses, the bellows 18 is necessarily formed of a material such as phosphor bronze, which although very suitable for use as a bellows is a rather higher electrical resistance. Because of this, the bellows 18 can become very hot, and it is cooled by pumping water into an inlet port 22 and extracting the heated water via an outlet port 23. The water flows through an annular cavity 24 and around the helical spirals of the deflector 21. The circular swirling motion imparted to the water by the shape of the spiral causes the water to be flung outwardly into the convolutions 29 of the convoluted wall of the bellows 18, thereby purging the convolutions of air which might otherwise be trapped within them. It has been found that even though the deflector 21 is very much shorter than the fully extended length of the bellows 18, the induced circular swirling motion of the water continues even to the far end of the bellows adjacent to the vanes 4. In order to enhance the swirling motion of the water, the outer diameter of the deflector 21 is made as large as possible, consistent with the need for the inner edges 20 of the bellows to slide smoothly over it. This prevents any significant mass of water simply sliding over the outer surface of the deflector in a smooth manner. The water heated by its passage through the bellows passes through a port 25 into the tube 11, and flows back along the inside of this hollow tube, and via a further port 26 in the slider 9 to the outlet port 23.

The swirling motion of the water induced by the shaped deflector 21 has been found to provide very satisfatory cooling of the bellows 18 without greatly impairing the flow rate of the water, so that the temperature difference of the water at the inlet and outlet portions is relatively low, and in particular the outlet temperature may be held below about 85° C. Above this temperature, air bubbles are liable to form in the water thereby impairing its thermal conduction properties.

As previously mentioned the deflector 21 is shown in greater detail in FIG. 2. The left hand side of the drawing shows a six start helical spiral groove 30 and a port 31 through which the water is admitted into the inside surface of the bellows. The right hand portion of the drawing is a sectional view which illustrates the groove profile more clearly.

I claim:

1. A cooling arrangement including an expandable tubular bellows having a convoluted wall and being arranged for movement between a contracted position and an expanded position, an elongate deflector mounted within the bellows and having such a length as to lie along the length of the bellows over a plurality of convolutions of the convoluted wall when the bellows is in its contracted position, and means for admitting a fluid coolant flow into the region between the inner surface of the wall of the bellows and the deflector, the deflector being arranged to deflect the fluid coolant flow into the convolutions of the convoluted wall.

2. An arrangement as claimed in claim 1 and wherein the elongate deflector is in the form of a helical spiral, the spirally shaped surface of which deflects the fluid coolant flow.

3. An arrangement as claimed in claim 1 or 2 and wherein the fluid is introduced at one end of the bellows.

4. An arrangement as claimed in claim 3 and wherein the deflector is arranged so that when the bellows is expanded the deflector is positioned towards that end of the bellows at which the fluid coolant is admitted.

5. An arrangement as claimed in claim 4 and further including means for removing fluid coolant from the bellows, both said means for admitting and for removing the fluid coolant being located at the same end of the bellows, and means for causing the fluid to flow over the outer surface of the deflector when it is admitted and being returned along a channel formed within the body of the deflector.

6. An arrangement as claimed in claim 2, and wherein the bellows is of circular cross-section, and its diameter at a minima position is only slightly greater than the outer diameter of the helical spiral surface of the deflector.

7. An arrangement as claimed in claim 2 and wherein the deflector is made in the form of a multi-start helical spiral which therefore has a plurality of separate spirals.

8. An arrangement as claimed in claim 1 or 2 and wherein the axial length of the elongate deflector corresponds at least approximately to the minimum length of the bellows when contracted.

9. An arrangement as claimed in claim 1 or 2 and wherein the convoluted wall of the bellows is formed of phosphor bronze.

10. An arrangement as claimed in claim 1, and wherein the elongate deflector and the tubular bellows each has a longitudinal axis and the longitudinal axis of the elongate deflector is substantially aligned with that of the tubular bellows.

11. A variable capacitor in combination with the cooling arrangement of claim 1, said capacitor including two sets of vanes, one set of which is carried by the movable end of said expandable tubular bellows.

12. An arrangement as claimed in claim 1, wherein said bellows is axially expandable.

13. A cooling arrangement including:
an expandable tubular bellows having a convoluted wall presenting an inner surface;
an elongate deflector means mounted within said bellows; and
means for admitting a fluid coolant flow into the region between the inner surface of said convoluted wall of said bellows and said deflector means;
said deflector means being arranged to deflect the coolant flow into the convolutions of said convoluted wall to prevent heat build-up in said convoluted wall.

* * * * *